(12) United States Patent
Yano et al.

(10) Patent No.: US 8,120,815 B2
(45) Date of Patent: Feb. 21, 2012

(54) IMAGE PROCESSING METHOD AND IMAGE FORMING DEVICE FOR GENERATING PROFILES FOR COLOR REPRODUCTION

(75) Inventors: Toshiyuki Yano, Kanagawa (JP); Yoshiharu Hibi, Kanagawa (JP); Ryouichi Satoh, Kanagawa (JP); Toshifumi Takahira, Kanagawa (JP); Masaomi Sakamoto, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 527 days.

(21) Appl. No.: 11/957,521

(22) Filed: Dec. 17, 2007

(65) Prior Publication Data
US 2008/0291498 A1  Nov. 27, 2008

(30) Foreign Application Priority Data
May 22, 2007 (JP) ................................. 2007-135620

(51) Int. Cl.
*G06K 15/00* (2006.01)
*G06K 9/00* (2006.01)
*H04N 1/60* (2006.01)

(52) U.S. Cl. ........... 358/3.1; 358/2.1; 358/1.9; 382/100; 382/162

(58) Field of Classification Search .................. 358/518, 358/527, 1.9; 382/162, 167
See application file for complete search history.

(56) References Cited

U.S. PATENT DOCUMENTS

| | | | | |
|---|---|---|---|---|
| 6,088,095 A * | 7/2000 | Sharma | ....................... | 356/243.5 |
| 6,351,320 B1 * | 2/2002 | Shin | ............................... | 358/1.9 |
| 6,853,464 B1 * | 2/2005 | Ueda et al. | ..................... | 358/1.9 |
| 6,888,961 B1 * | 5/2005 | Tamagawa et al. | ........... | 382/162 |
| 6,947,174 B1 * | 9/2005 | Chen et al. | ..................... | 358/1.9 |
| 7,142,332 B2 * | 11/2006 | Degani et al. | .................. | 358/3.1 |
| 7,206,099 B2 * | 4/2007 | Brewington et al. | ........ | 358/3.06 |
| 7,298,513 B2 * | 11/2007 | Namikata | ..................... | 358/1.15 |
| 7,599,634 B2 * | 10/2009 | Kuo et al. | ........................ | 399/45 |
| 7,667,874 B2 * | 2/2010 | MacDonald et al. | .......... | 358/2.1 |
| 7,729,015 B2 * | 6/2010 | Mizes et al. | .................... | 358/3.1 |
| 2006/0119874 A1 | 6/2006 | Kurihara | | |

FOREIGN PATENT DOCUMENTS

| | | |
|---|---|---|
| JP | 2006-085639 A | 3/2006 |
| JP | 2006-166138 A | 6/2006 |
| JP | 2006-335020 A | 12/2006 |

OTHER PUBLICATIONS

Japanese Office Action dated Sep. 20, 2011 issued in the corresponding Japanese Patent Application No. 2007-135620 with English Translation (3 pages).

* cited by examiner

*Primary Examiner* — Twyler Haskins
*Assistant Examiner* — Christopher D Wait
(74) *Attorney, Agent, or Firm* — Sughrue Mion, PLLC

(57) ABSTRACT

An image processing method is provided. The image processing method includes: generating profiles for color reproduction, classified for each of recording papers, from at least one of particular characteristic data of the each recording paper, which is generated on the basis of factors that affect color reproduction and particular generation information of the each recording paper, which is obtained by printing plural patch patterns at the recording paper and performing colorimetry of the printed patch patterns; and when implementing basic extraction control for extracting a profile that matches in at least one of the characteristic data and the generation information, if no profile that matches in at least one of the characteristic data and the generation information is extracted, extracting a profile that approximates in accordance with a pre-specified order of priority determination procedure to be a candidate.

6 Claims, 7 Drawing Sheets

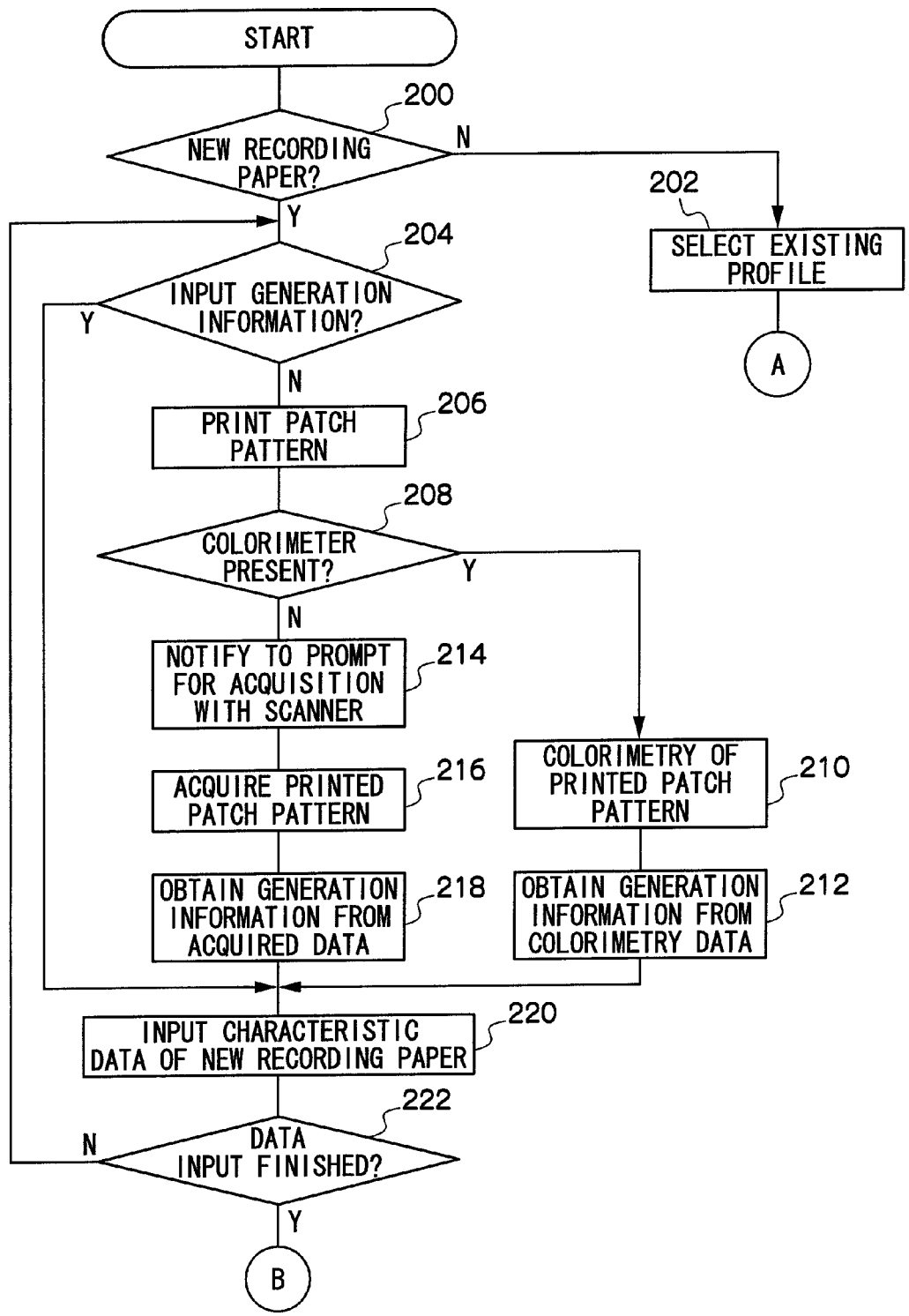

IMAGE PROCESSING METHOD AND IMAGE FORMING DEVICE FOR GENERATING PROFILES FOR COLOR REPRODUCTION

CROSS-REFERENCE TO RELATED APPLICATION

This application is based on, and claims priority under 35 USC 119 from Japanese Patent Application No. 2007-135620, filed May 22, 2007.

BACKGROUND

1. Technical Field

The present invention relates to an image processing method and an image forming device which feature a function for simulating color reproduction.

2. Related Art

Heretofore, in an image processing device including a printing function, when image data in which input densities of image data constituted with cyan (C), magenta (M), yellow (Y) and black (K), or of the individual colors C, M, Y and K, are at 100% ("solid densities") is outputted, color reproduction varies with a type of recording paper that is being printed on, even with the same image data.

This is caused by direct causes from the types of recording paper themselves, such as differences between ground colors of the recording papers, whether or not there are coatings at the surfaces of the recording paper and the like, and by indirect causes, such as fixing temperatures, fixing durations and the like in accordance with thicknesses of the recording papers.

Therefore, in an image processing device which features a function for simulating color reproduction of printing targets (for example, JapanColor colors, JMPA Color colors or the like), in order to generate a profile, it is necessary to generate a profile for each of types of recording paper that are to be used. That is, even with the same printing targets, profiles for respective types of recording paper that are to be used are necessary, and reproduction of desired colors is not always possible.

To generate a profile, it is necessary to print out a patch pattern of patch sets based on numerous combinations of CMYK on a recording paper and, by performing colorimetry on the printed patch pattern, model printing characteristics for the CMYK inputs on that recording paper with that image recording device. Thus, generating a profile takes of the order of several hours. Further, to select from existing profiles a profile that approximates to a recording paper that is to be used, knowledge based on the experience of an operator is required.

SUMMARY

The present invention has been made in view of the above circumstances and provides an image processing method and an image forming device.

According to an aspect of the invention, there is provided an image processing method. The image processing method has a function which simulates color reproduction results in accordance with printing target data, which is a reproduction objective of a color to be printed, and that is capable of printing processing with desired color reproduction on the basis of results of the simulation. The image processing method includes: generating profiles for color reproduction, classified for each of recording papers, from at least one of particular characteristic data of the each recording paper, which is generated on the basis of factors that affect color reproduction, including at least one of a surface-processing condition, a thickness, and a ground color, and particular generation information of the each recording paper, which is obtained by printing plural patch patterns at the recording paper and performing colorimetry of the printed patch patterns; and when implementing basic extraction control for extracting a profile that matches in at least one of the characteristic data and the generation information, if no profile that matches in at least one of the characteristic data and the generation information is extracted, extracting a profile that approximates in accordance with a pre-specified order of priority determination procedure to be a candidate.

BRIEF DESCRIPTION OF THE DRAWINGS

An exemplary embodiment of the present invention will be described in detail based on the following figures, wherein:

FIG. 6A and FIG. 6B are a flowchart showing a flow of processing of profile extraction relating to the exemplary embodiment of the present invention

DETAILED DESCRIPTION

Figure 1:
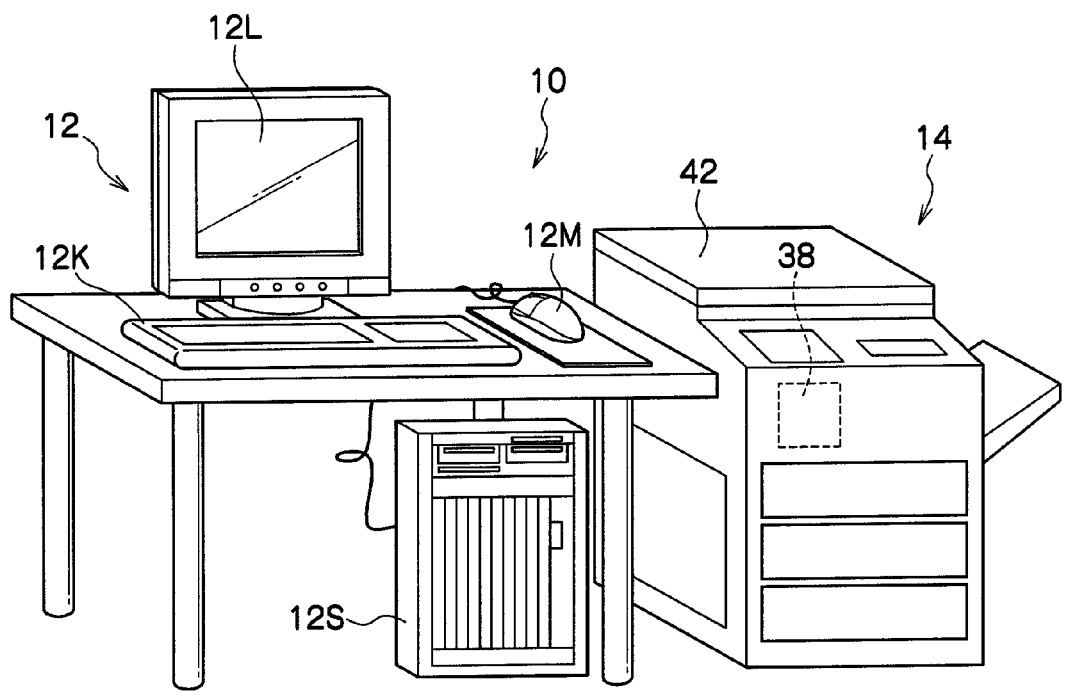
FIG. 1 is a front view showing structure of an image forming device relating to the exemplary embodiment of the present invention.

FIG. 1 shows an image forming device 10 relating to an exemplary embodiment of the present invention.

The image forming device 10 is structured with a print server 12 and a printer 14. The print server 12 is equipped with a server main unit 12S, a keyboard 12K, a mouse 12M, and a display section 12L such as a CRT display, an LCD display or the like. The print server 12 implements printing output in accordance with a printing job.

The printer 14 is equipped with a printing section which prints an image and a scanner 42 which acquires image data, and is also equipped with a calorimeter 38 which acquires image data for color reproduction in accordance with a type of the printer. Here, provided the calorimeter 38 is present, the scanner 42 is not necessary for the present invention.

Figure 2:
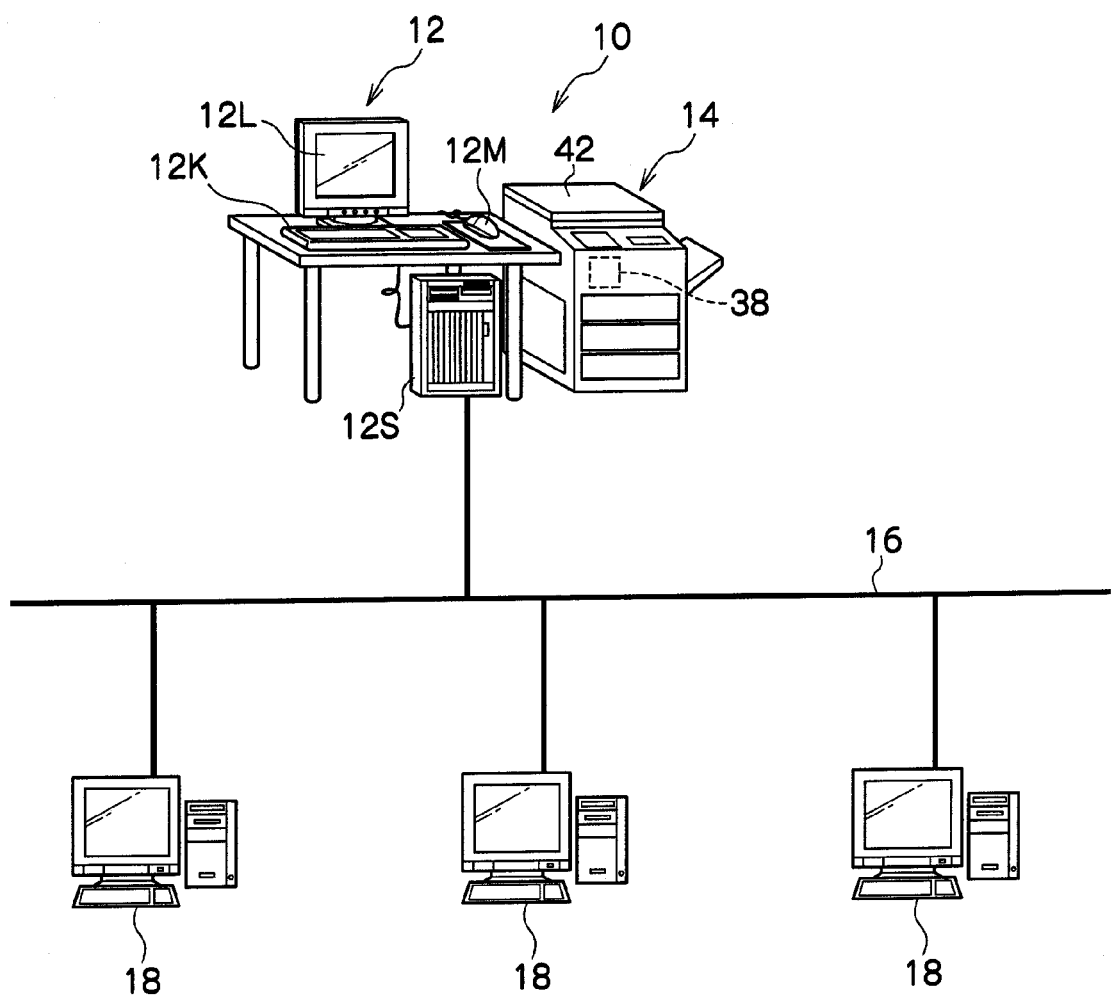
FIG. 2 is a schematic view showing connections between a print server relating to the exemplary embodiment of the present invention and client terminals.

At the image forming device 10, as shown in FIG. 2, an image forming device connected to a network 16 may be controlled by client terminals 18.

Figure 3:
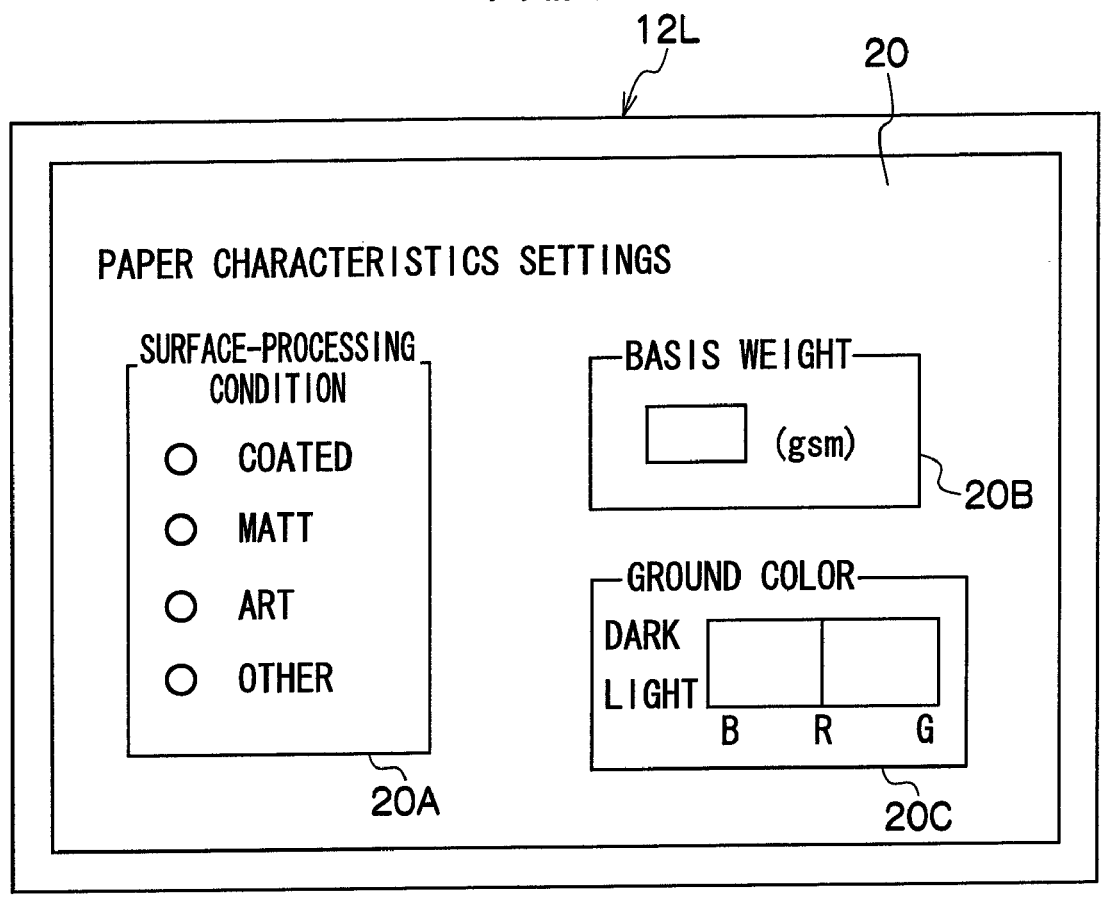
FIG. 3 is a schematic view of a data input screen relating to the exemplary embodiment of the present invention.

FIG. 3 is a schematic view of a settings screen on a PC, which specifies characteristic data of a recording paper, at the display section 12L of the print server 12 of the exemplary embodiment of the present invention.

A paper type settings screen 20 of the display section 12L is structured with a list image 20A at which one surface-processing condition is selected from four types, an image 20B at which a basis weight is inputted to serve as a thickness, and a selection image 20C at which a ground color is pin-pointed on a color density pattern.

Herein, the image forming device 10 implements printing output by the printer 14 in accordance with a printing job.

Image data created by a PC or the like is image data in an RGB color space (RGB signals), but the printer 14 handles image data in a CMYK color space (CMYK signals). Accordingly, using a profile, the RGB signals are converted to data in a device-independent color space, for example, the L*a*b* color space, and then converted to CMYK signals in a color space dependent on the output side device, and printed.

With printing using a profile, printed results are close to printing targets, which are reproduction objectives of colors that are printed. However, recording papers that are printed on may not be able to reproduce desired colors using the same profile, due to factors such as surface-processing conditions, thicknesses, ground colors and so forth.

Hitherto, from the experience of an expert, characteristics of a recording paper to be used have been judged and a profile of which color reproduction characteristics are favorable has been extracted depending on printing targets. However, in cases in which experience is insufficient or the like, extracting a favorable profile has been difficult.

Accordingly, in the exemplary embodiment of the present invention, in order to create a profile, generation information is obtained by printing a CMYK patch pattern and performing colorimetry, and the generation information and characteristic data, such as a surface-processing condition, a thickness, a ground color and the like which are factors affecting color reproduction on the recording paper, are associated with a profile and saved.

Below, details of generation and extraction of a profile of the present invention will be described.

Figure 4:
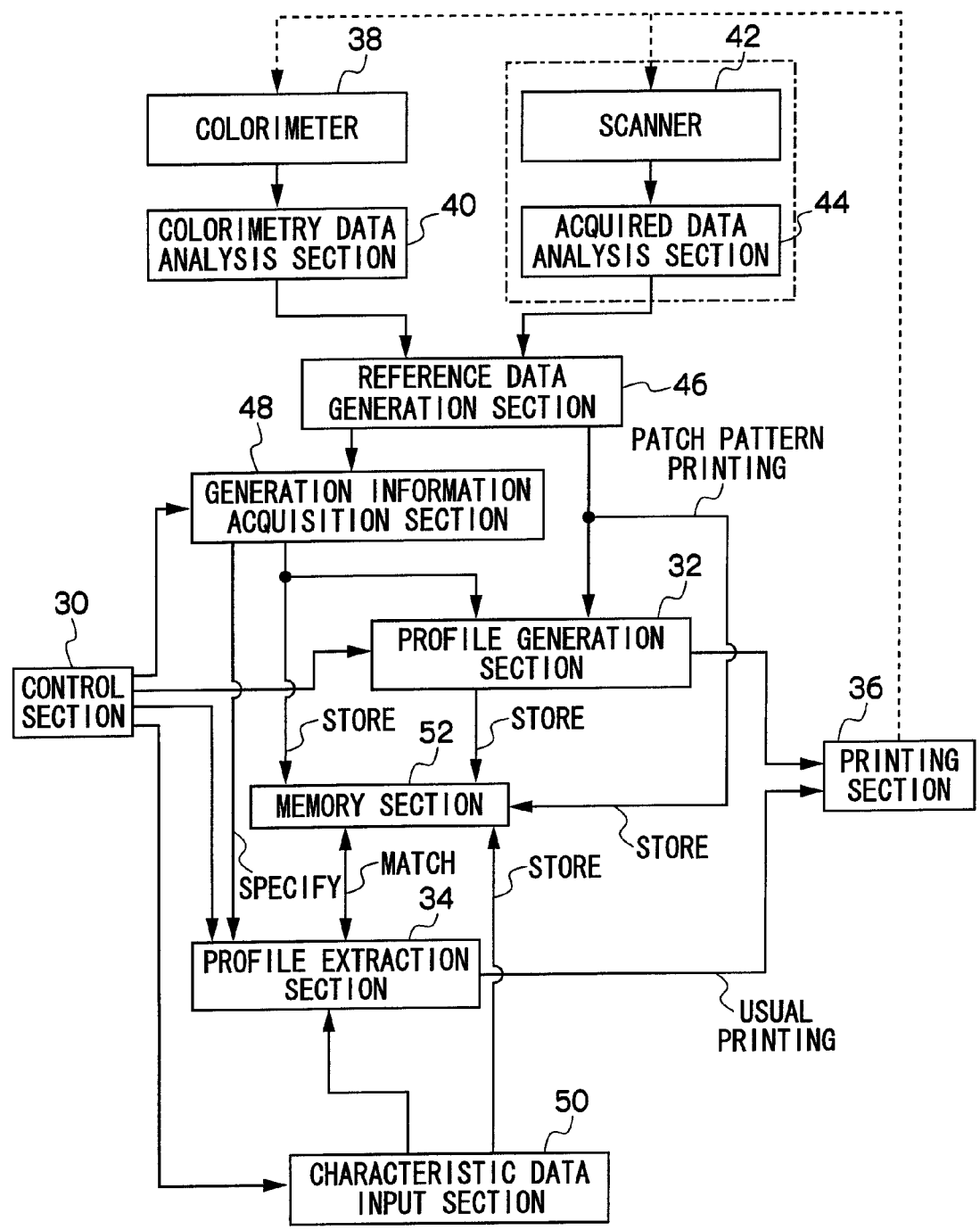
FIG. 4 is a functional block diagram for implementing generation and extraction of profiles at the image forming device relating to the exemplary embodiment of the present invention.

FIG. 4 is a functional block diagram for implementing generation and extraction of a profile in the image forming device 10 of the exemplary embodiment of the present invention.

A control section 30 is connected to a profile generation section 32, a profile extraction section 34, a generation information acquisition section 48 and a characteristic data input section 50. When an operator instruction is a profile creation instruction, the control section 30 sends the profile creation instruction and printing target data to the profile generation section 32. When an operator instruction is a printing instruction with employment of a profile, the control section 30 sends printing target data and printing data to the profile extraction section 34. The control section 30 also sends profile creation instructions and profile-employing printing instructions to the generation information acquisition section 48 and to the characteristic data input section 50.

The profile generation section 32 is connected to a printing section 36 and a memory section 52. The profile generation section 32 sends patch pattern data to the printing section 36 in accordance with a profile creation instruction from the control section 30, so as to print a patch pattern which is a CMYK patch set.

The printing section 36 is connected to the calorimeter 38. The printing section 36 prints a patch pattern on the basis of the patch pattern data and sends printing results to the calorimeter 38.

The calorimeter 38 is connected to a colorimetry data analysis section 40. The calorimeter 38 performs colorimetry of the patch pattern which has been printed by the printing section 36, and sends colorimetry data, which is results of the colorimetry, to the colorimetry data analysis section 40.

The colorimetry data analysis section 40 is connected to a reference data generation section 46. The colorimetry data analysis section 40 analyses the colorimetry data sent from the colorimeter 38, and sends analysis results data to the reference data generation section 46.

Here, provided the image forming device 10 is equipped with the colorimeter 38, colorimetry of a patch pattern printed by the printing section 36 can be performed using the calorimeter 38. However, if the image forming device 10 is not equipped with the calorimeter 38, a patch pattern can be acquired using the scanner 42.

The scanner 42 is connected with an acquired data analysis section 44. The scanner 42 acquires a patch pattern printed by the printing section 36, and sends data that is acquired to the scanner 42.

The acquired data analysis section 44 is connected to the reference data generation section 46. The acquired data analysis section 44 analyses acquired data sent from the scanner 42, and sends analysis results data to the reference data generation section 46.

The reference data generation section 46 is connected to the generation information acquisition section 48, the profile generation section 32 and the memory section 52. The reference data generation section 46 generates reference data on the basis of analysis results data sent from the colorimetry data analysis section 40, and sends the reference data to the generation information acquisition section 48 and the profile generation section 32. The reference data generation section 46 also sends characteristic data such as ground color data and the like of the recording paper, which is included in the analysis results sent from the colorimetry data analysis section 40, to the memory section 52.

The generation information acquisition section 48 is connected to the profile generation section 32, the profile extraction section 34 and the memory section 52. On the basis of the reference data sent from the reference data generation section 46, the reference data generation section 46 obtains generation information such as: colorimetry data for primary color solid density data, of C, M, Y and K, in the patch pattern; colorimetry data for secondary color solid density data, of R, G, B and suchlike which are obtained by combining C, M and Y; colorimetry data for intermediate density data; colorimetry data for density data of process grays; ground color data of the recording paper; and the like. The generation information acquisition section 48 also obtains generation information of colorimetry data for density data which is obtained by combining C, M, Y and K for particular color ranges, such as skin tones, skies, corporate colors or the like, in consideration of the priorities of a user. When a profile creation instruction is sent from the control section 30, the generation information acquisition section 48 sends the obtained generation information to the profile generation section 32 and the memory section 52, and when a profile-employing printing instruction is sent from the control section 30, the generation information acquisition section 48 sends the obtained generation information to the profile extraction section 34 in order to specify a profile.

The profile generation section 32 then generates a profile on the basis of the printing target data sent from the control section 30, the reference data sent from the reference data generation section 46 and the generation information data sent from the generation information acquisition section 48. The profile generation section 32 sends the profile that has been generated to the memory section 52.

The characteristic data input section 50 is connected to the profile extraction section 34 and the memory section 52. The characteristic data input section 50 sends recording paper characteristic data, which is inputted by an operator, to the memory section 52 when a profile creation instruction has been sent from the control section 30, and sends the same to the profile extraction section 34 when a profile-employing printing instruction has been sent from the control section 30.

The memory section 52 stores profiles sent from the profile generation section 32. The memory section 52 also stores characteristic data sent from the reference data generation section 46, generation information obtained by the generation information acquisition section 48 and characteristic data inputted at the characteristic data input section 50, in association with the profiles.

The profile extraction section 34 is connected to the printing section 36 and the memory section 52. On the basis of generation information sent from the generation information acquisition section 48 and characteristic data of a recording paper inputted from the characteristic data input section 50, the profile extraction section 34 matches up and extracts a profile stored at the memory section 52. The profile extraction section 34 sends the information of this profile and printing data, which is sent from the control section 30, to the printing section 36. The printing section 36 prints the printing data, employing the profile.

Below, operation of the exemplary embodiment of the present invention will be described.

Printing data which is sent, for example, directly from the print server 12 provided at the image forming device 10 or from the client terminals 18 is subjected to image processing by the print server 12. The printing data is sent to the printer 14, and printing is implemented. Here, printing using a profile for color reproduction is possible.

First, for extracting profiles in the exemplary embodiment of the present invention, generation of a profile will be described.

Figure 5:
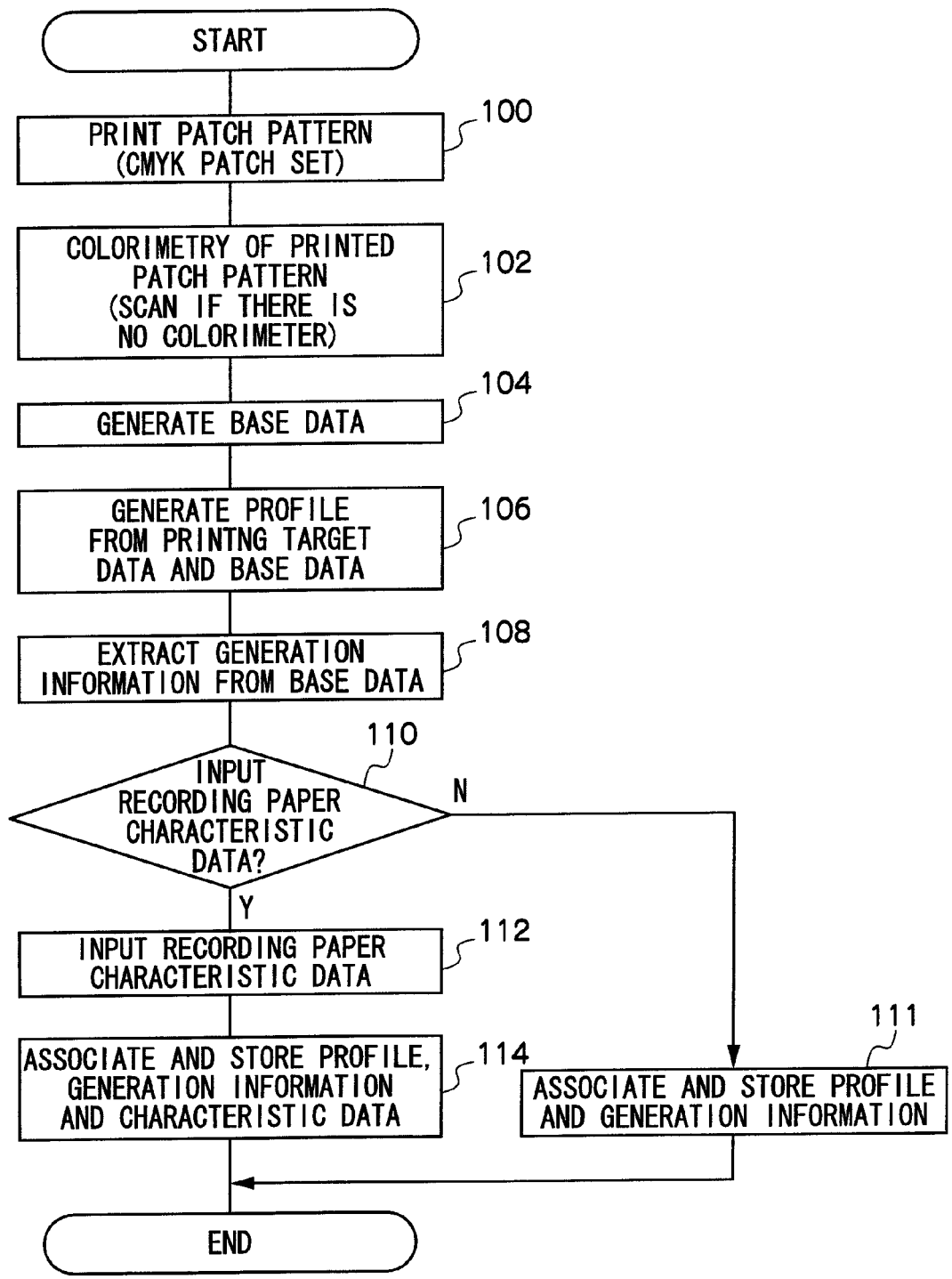
FIG. 5 is a flowchart showing a flow of processing of profile generation relating to the exemplary embodiment of the present invention.

FIG. 5 is a flowchart showing a flow of processing of generation of a profile.

In step 100, the printing section 36 prints a patch pattern, which is a CMYK patch set, and the process advances to step 102.

In step 102, colorimetry of the patch pattern printed by the printing section 36 is performed by the colorimeter 38. If the calorimeter 38 is not present, the patch pattern is acquired by the scanner 42. When colorimetry has been performed, the process advances to step 104.

In step 104, the colorimetry data from step 102 is analyzed by the colorimetry data analysis section 40 or the acquired data analysis section 44. The reference data generation section 46 generates reference data, and the process advances to step 106.

In step 106, the profile generation section 32 generates a profile on the basis of the printing target data and the reference data that has been generated by the reference data generation section 46, and the process advances to step 108.

In step 108, the generation information acquisition section 48 extracts generation information included in the reference data, and the process advances to step 110.

In step 110, it is judged whether or not characteristic data of the recording paper is to be inputted by an operator. If the judgement is negative, that characteristic data of the recording paper is not to be inputted, the process advances to step 111. If the judgement is positive, that characteristic data is to be inputted, the process advances to step 112.

In step 111, the profile and the generation information are associated and stored at the memory section 52, and this routine ends.

In step 112, characteristic data of the recording paper is inputted by an operator, and the process advances to step 114.

In step 114, the profile, the generated information and the characteristic data are associated and stored at the memory section 52, and this routine ends.

Next, extraction of a profile will be described.

Figure 6B:
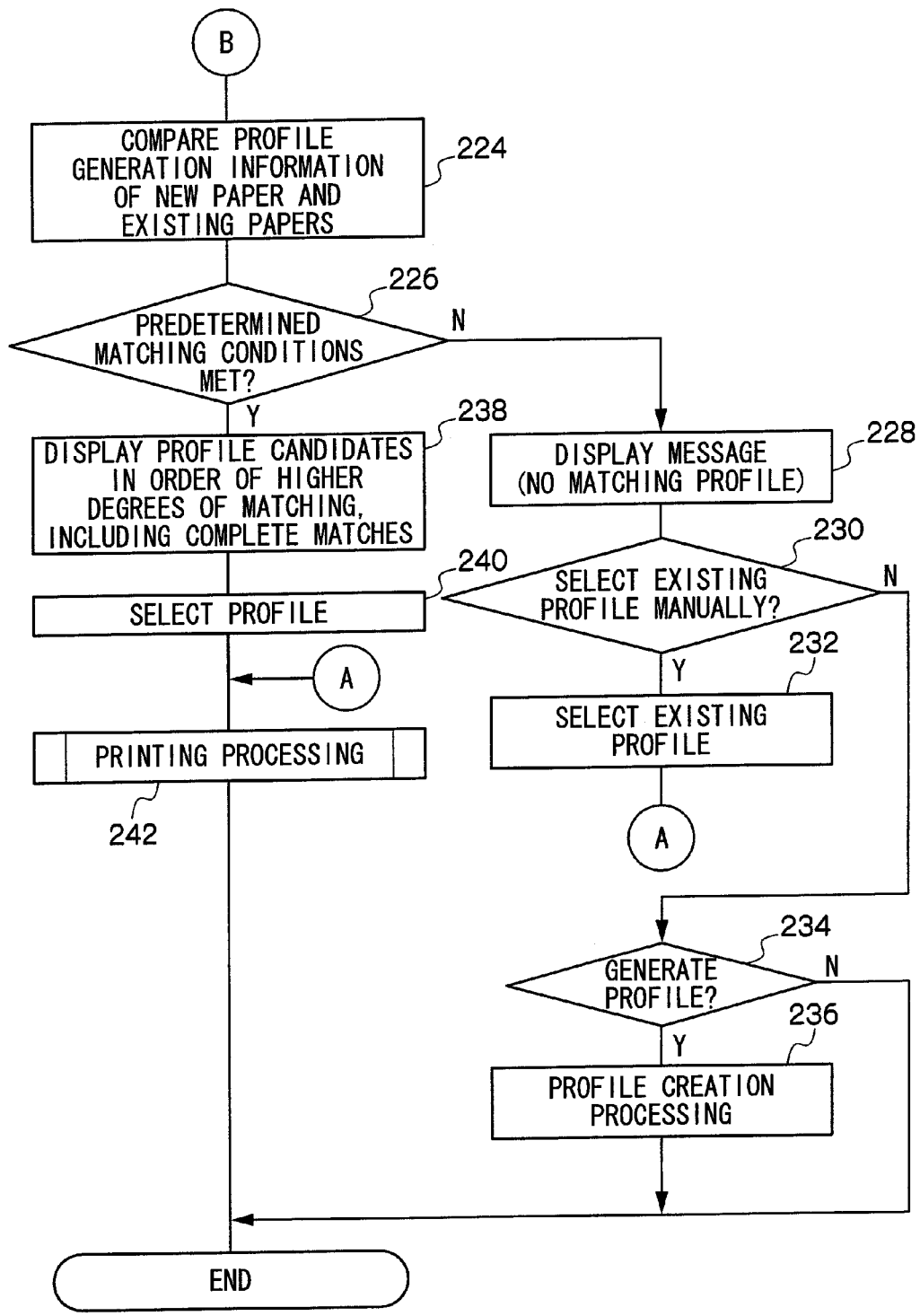

FIG. 6A and FIG. 6B are a flowchart showing a flow for extracting a profile.

In step 200, it is judged whether or not a new recording paper is to be used. If the judgement is negative, that new recording paper is not to be used, the process advances to step 202.

In step 202, an existing profile is selected, and the process advances to step 242.

If the judgement in step 200 is positive, that there is a new recording paper being used, the process advances to step 204.

In step 204, it is judged whether or not generation information is to be inputted. If the judgement is negative, that generation information will not be inputted, the process advances to step 206, and if the judgement is positive, that generation information will be inputted, the process advances to step 220.

In step 206, a patch pattern, which is a CMYK patch set, is printed by the printing section 36, and the process advances to step 208.

In step 208, it is judged whether or not the calorimeter 38 is present. If the judgement is positive, that the calorimeter 38 is present, the process advances to step 210.

In step 210, colorimetry of the printed patch pattern is performed by the calorimeter 38, and the process advances to step 212.

In step 212, colorimetry data which has been measured by the calorimeter 38 is analyzed by the colorimetry data analysis section 40. The generation information acquisition section 48 obtains generation information of the new recording paper, and the process advances to step 220.

If the judgement in step 208 is negative, that there is no calorimeter 38, the process advances to step 214.

In step 214, a notification prompting acquisition of the patch pattern using the scanner 42 is implemented, and the process advances to step 216.

In step 216, the printed patch pattern is acquired by the scanner 42, and the process advances to step 218.

In step 218, the patch pattern that the scanner 42 has acquired is analyzed by the acquired data analysis section 44. The generation information acquisition section 48 obtains generation information for the new recording paper, and the process advances to step 220.

In step 220, an operator inputs characteristic data of the recording paper from the characteristic data input section 50, and the process advances to step 222.

In step 222, it is judged whether or not input of data relating to generation information and characteristic data has finished. If the judgement is negative, that the input has not finished, the process advances to step 204 and, again, input of generation information of the new recording paper is implemented.

If the judgement in step 222 is positive, that data input relating to the new recording paper has finished, the process advances to step 224.

In step 224, the generation information of the new recording paper is compared with generation information included in existing profiles, and the process advances to step 226.

In step 226, it is judged whether or not predetermined matching conditions are met. For these predetermined matching conditions, usually, degrees of matching are judged in sequence for: colorimetry data for primary color solid density data of C, M, Y and K; colorimetry data for secondary color solid density data of R, G, B and the like, which are provided by combining C, M and Y; colorimetry data for process gray density data; recording paper ground color data; and particular colors considered important by a client. An order of priority of these matching conditions can be altered in accordance with matters that are considered important by a client.

If the judgement in step 226 is negative, that the predetermined matching conditions are not met, the process advances to step 228.

In step 228, a message that there is no profile matching the new recording paper is displayed, and the process advances to step 230.

In step 230, it is judged whether or not an existing profile is to be selected manually. If this is positive, that an existing profile is to be selected manually, the process advances to step 232.

In step 232, an existing profile is selected, and the process advances to step 242.

If the judgement in step 230 is negative, that an existing profile is not to be selected manually, the process advances to step 234.

In step 234, it is judged whether or not a new profile for the new recording paper is to be generated. If the judgement is negative, that a new profile is not to be generated, this routine ends. If the judgement is positive, that a new profile is to be generated, the process advances to step 236.

In step 236, processing for generating a new profile is implemented, and this routine ends.

If the judgement in step 226 is positive, that there is a profile for which the predetermined matching conditions are met, the process advances to step 238.

In step 238, candidate profiles are displayed in order of higher degrees of matching, including complete matching, and the process advances to step 240.

In step 240, the operator selects a profile, and the process advances to step 242.

In step 242, printing processing is implemented using a profile included in the selected profile, and this routine ends.

As has been described hereabove, a profile is generated and stored on the basis of printing target data representing a reproduction objective to be printed, and reference data obtained by printing and performing colorimetry on a patch pattern of a patch set based on arbitrary combinations of C, M, Y and K. Here, generation information included in the reference data obtained by colorimetry of the patch pattern, and characteristic data of the recording paper, such as a surface-processing condition, a thickness, a ground color and the like, are associated with the profile and stored. Hence, for a new recording paper for which there is no profile, it is possible to extract a profile that approximates thereto, including complete matching, from pre-existing profiles on the basis of generation information and recording paper characteristic data thereof. Furthermore, because an order of priority for extracting approximating profiles can be altered, closer approximating profiles can be extracted.

Herein, the generation information and recording paper characteristic data are stored in association with a profile, but this is not a limitation. For example, it is possible to store such data in a log file or the like in association with a profile.

Furthermore, a settings screen for specifying recording paper characteristic data is shown in FIG. 3, but this is not a limitation. Settings other than the items shown in FIG. 3 may be added as appropriate. Moreover, a screen or the like which performs detailed settings for the generation information may be provided.

What is claimed is:

1. An image processing method that has a function which simulates color reproduction results in accordance with printing target data, which is a reproduction objective of a color to be printed, and that is capable of printing processing with desired color reproduction on the basis of results of the simulation, the image processing method comprising:

generating profiles for color reproduction, classified for each of recording papers, from at least one of particular characteristic data of the each recording paper, which is generated on the basis of factors that affect color reproduction, including at least one of a surface-processing condition, a thickness, and a ground color, and particular generation information of the each recording paper, which is obtained by printing plural patch patterns at the recording paper and performing colorimetry of the printed patch patterns; and extracting a profile that matches in at least one of the characteristic data and the generation information, and if no profile matches the at least one of the characteristic data and the generation information, extracting a profile based on judging a degree of matching, wherein the profile is extracted by judging the degrees of matching in the following sequence: matching colorimetry data for primary color density data of cyan, magenta, yellow and black; matching colorimetry data for secondary color density data that is provided by combining cyan, magenta and yellow; matching colorimetry data for process gray density data that combines predetermined densities of each of the colors cyan, magenta and yellow; and matching colorimetry data for gray density data.

2. The image processing method of claim 1, wherein the predetermined matching conditions are alterable.

3. The image processing method of claim 1, wherein the generation information includes: colorimetry data for primary color density data of cyan, magenta, yellow and black; colorimetry data for secondary color density data that combines pairs of colors from cyan, magenta and yellow; colorimetry data for process gray density data that combines predetermined densities of each of the colors cyan, magenta and yellow; and colorimetry data for arbitrary density data combining cyan, magenta, yellow and black in correspondence with a particular color range.

4. An image forming device comprising:

a characteristic data creation component that creates particular characteristic data of a recording paper on the basis of factors that affect color reproduction, including at least one of a surface-processing condition, a thickness, and a ground color;

a generation information creation component that obtains generation information, which is a characteristic of a relationship of output color data to input color data, by printing plural patch patterns on the recording paper and performing colorimetry of the printed patch patterns;

a profile generation component that generates a profile for color reproduction at the recording paper, for each of different kinds of recording paper, from printing target data, which represents a reproduction objective of a color to be printed, and the generation information;

a memory component that stores in association with one another the profile and at least one of the generation information and the characteristic data, as required for the profile; and a profile extraction component that, if a profile of the particular recording paper has not been stored at the memory component, extracts from the profiles stored at the memory component a profile that approximates to the particular recording paper on the basis of generation information and characteristic data of the recording paper, by judging a degree of matching, wherein the profile is extracted by judging the degrees of matching in the following sequence: matching colorimetry data for primary color density data of cyan, magenta, yellow and black; matching colorimetry data for secondary color density data that is provided by combining cyan, magenta and yellow; matching colorimetry data for process gray density data that combines predetermined densities of each of the colors cyan, magenta and yellow; and matching colorimetry data for gray density data.

5. The image forming device of claim 4, further comprising a printing implementation component that, when printing processing is to be performed using a particular recording paper, extracts a profile of the particular recording paper from the profiles that have been stored at the memory component, and implements printing on the basis of the extracted profile.

6. The image forming device of claim 4, wherein the generation information includes: colorimetry data for primary color density data of cyan, magenta, yellow and black; colorimetry data for secondary color density data that combines pairs of colors from cyan, magenta and yellow; colorimetry data for process gray density data that combines predetermined densities of each of the colors cyan, magenta and yellow; and colorimetry data for arbitrary density data combining cyan, magenta, yellow and black in correspondence with a particular color range.

* * * * *